(12) United States Patent
Wenger

(10) Patent No.: US 8,872,696 B2
(45) Date of Patent: Oct. 28, 2014

(54) INTERMITTENT SURFACE MEASUREMENT

(75) Inventor: Fabian Wenger, Göteborg (SE)

(73) Assignee: Rosemount Tank Radar AB, Gothenburg (SE)

( * ) Notice: Subject to any disclaimer, the term of this patent is extended or adjusted under 35 U.S.C. 154(b) by 168 days.

(21) Appl. No.: 13/238,443

(22) Filed: Sep. 21, 2011

(65) Prior Publication Data

US 2013/0069817 A1  Mar. 21, 2013

(51) Int. Cl.
*G01S 13/88* (2006.01)
*G01S 13/08* (2006.01)
*G01F 23/284* (2006.01)

(52) U.S. Cl.
CPC ............... *G01F 23/284* (2013.01); *G01S 13/08* (2013.01)
USPC .......................... 342/124; 324/644; 73/290 R

(58) Field of Classification Search
CPC .... G01F 23/284; G01F 23/2845; G01S 13/88
USPC ............................ 342/124; 324/644; 73/290 R
See application file for complete search history.

(56) References Cited

U.S. PATENT DOCUMENTS

| | | | | |
|---|---|---|---|---|
| 4,805,453 A * | 2/1989 | Haynes | | 73/292 |
| 6,014,100 A | 1/2000 | Fehrenbach | | |
| 6,634,228 B2 * | 10/2003 | Deserno et al. | | 73/290 V |
| 7,460,057 B2 * | 12/2008 | Fehrenbach et al. | | 342/124 |
| 7,487,057 B2 * | 2/2009 | Heilig et al. | | 702/106 |
| 7,823,446 B2 * | 11/2010 | Nilsson et al. | | 73/290 V |
| 7,884,755 B2 * | 2/2011 | Fehrenbach et al. | | 342/124 |
| 7,895,889 B2 * | 3/2011 | Jirskog | | 73/293 |
| 8,405,542 B2 * | 3/2013 | Corbe et al. | | 342/124 |
| 2006/0137446 A1 | 6/2006 | Wennerberg | | |
| 2008/0129583 A1 * | 6/2008 | Larsson et al. | | 342/124 |
| 2012/0169528 A1 * | 7/2012 | Edvardsson et al. | | 342/124 |

OTHER PUBLICATIONS

International Search Report from PCT Application No. PCT/EP2011/066701, dated Sep. 28, 2012, 3 pgs.
Written Opinion from PCT Application No. PCT/EP2011/066701, dated Sep. 28, 2012, 4 pgs.

* cited by examiner

*Primary Examiner* — Matthew M Barker
(74) *Attorney, Agent, or Firm* — Westman, Champlin & Koehler, P.A.

(57) ABSTRACT

A method of determining a filling level of a product contained in a tank, the method comprising the steps of: a) transmitting an electromagnetic probing signal towards a target area of a surface of the product; b) receiving a reflected probing signal being a reflection of the electromagnetic probing signal at the surface; c) determining a parameter value indicative of an amplitude of the reflected probing signal; if the parameter value is indicative of an amplitude larger than a predetermined threshold value: d) transmitting an electromagnetic measuring signal towards the target area of the surface; e) receiving a return signal being a reflection of the electromagnetic measuring signal at the surface; and f) determining the filling level based on a time relation between the electromagnetic measuring signal and the return signal.

14 Claims, 5 Drawing Sheets

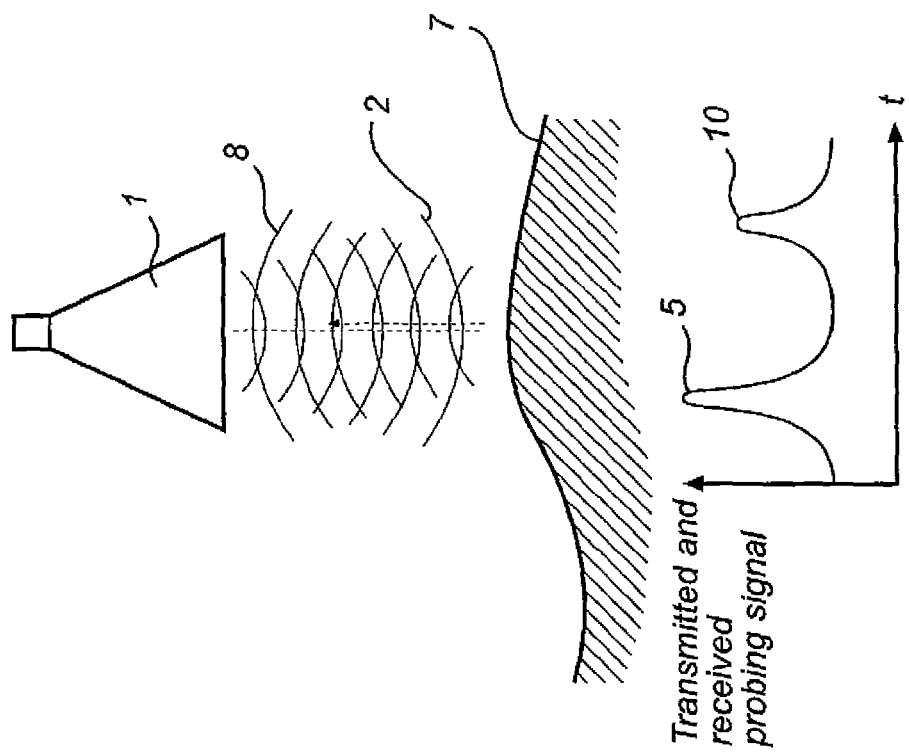
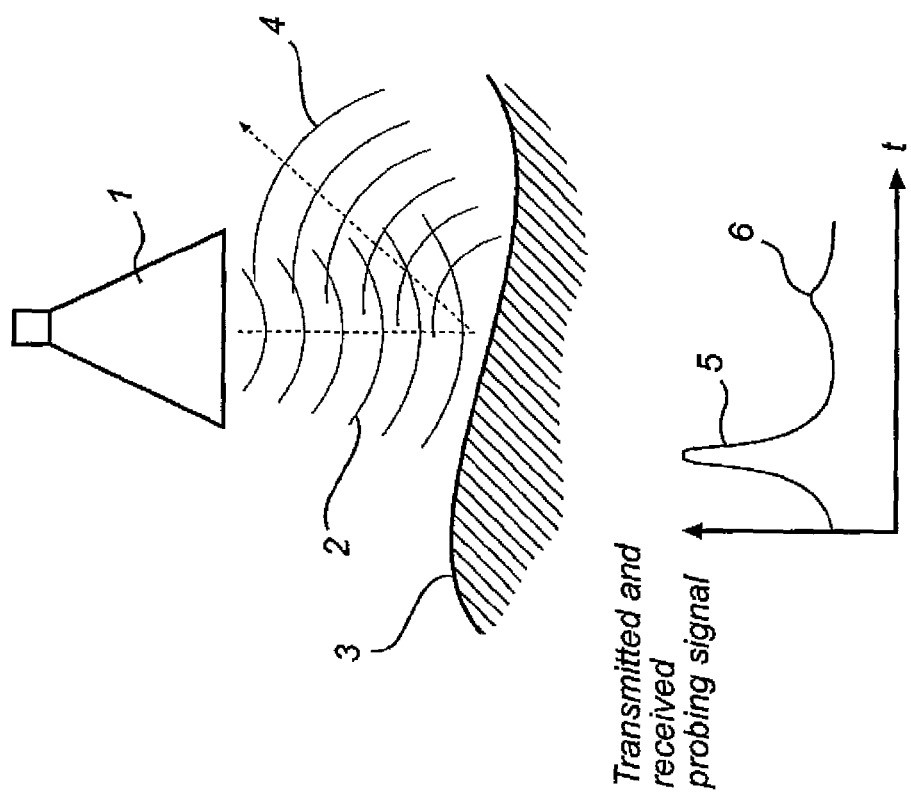
Fig. 1a
Fig. 1b

INTERMITTENT SURFACE MEASUREMENT

FIELD OF THE INVENTION

The present invention relates to a level gauge system using electromagnetic waves for determining the distance to a surface of a product contained in a tank.

TECHNICAL BACKGROUND

Field devices, such as radar level gauges, are suitably used for measuring the level of products such as process fluids, granular compounds and other materials. An example of such a radar level gauge can include a microwave unit for transmitting microwaves towards the surface and receiving microwaves reflected by the surface, processing circuitry arranged to communicate with the microwave unit and to determine the level based on a relation between transmitted and received microwaves.

In recent years, there has been an increasing demand for wireless measurement devices or systems with other limitations on power consumption, such as for example so called loop-powered systems that are connected by a 4-20 mA current loop. Wireless measurement devices may for example be powered by batteries or solar power. For such devices it is advantageous to improve the energy efficiency e.g. in order to increase the lifetime of batteries. Therefore, novel measurement devices having improved power efficiency are required in order to improve on conventional radar level gauges.

One approach leading to reduced power consumption is to reduce the time of the measurement, i.e. to make the measurement faster. However a shorter measuring time in combination with a continuous measurement scheme commonly used in radar level gauges will provide a large number of measurement results. An abundance of results may not necessarily lead to an improvement in either measurement accuracy or reliability. Furthermore, it is also increasingly difficult to handle and store the increasing amount of data generated, in particular given a limitation on energy consumption. Therefore, intermittent operation of a radar level gauge system where the system only performs a measurement at given time-intervals is an attractive alternative in order to improve energy efficiency.

However, there are problems associated also with intermittent measurements. For example, the system may be configured to wake up and perform a measurement at regular intervals and if the surface properties of the product to be measured are varying over time, a measurement may provide an unreliable result. Furthermore, the next measurement may also be unreliable, and so on, which may lead to long time periods between reliable measurements and unstable level readings.

Accordingly, there is a need for an improved level gauge system and a method for intermittently measuring the filling level of a product in a tank.

SUMMARY OF THE INVENTION

In view of the above-mentioned, a general object of the present invention is to provide an improved method and device for reliably determining a filling level of a product contained in a tank, thereby providing for improved reliability and energy efficiency. In particular it is an object of the present invention to provide for a reduced active time of an intermittent level gauge system, at least for some measurement conditions.

According to a first aspect of the present invention, this and other objects are achieved by a method of determining a filling level of a product contained in a tank, the method comprising the steps of: a) transmitting an electromagnetic probing signal towards a target area of a surface of the product; b) receiving a reflected probing signal being a reflection of the electromagnetic probing signal at the surface; c) determining a parameter value indicative of an amplitude of the reflected probing signal; if the parameter value is indicative of an amplitude larger than a predetermined threshold value: d) transmitting an electromagnetic measuring signal towards the target area of the surface; e) receiving a return signal being a reflection of the electromagnetic measuring signal at the surface; and f) determining the filling level based on a time relation between the electromagnetic measuring signal and the return signal.

The present invention is based on the realization that it is advantageous to establish that measurement conditions are such that it is likely that a measurement will be successful prior to performing a measurement cycle. In a measurement system using the transmission of an electromagnetic signal towards a surface, and the reflected signal resulting from a reflection at the surface of a product, a sufficient portion of the transmitted signal should be reflected and received by the receiver to enable an analysis of the reflected signal, thereby establishing the distance to the surface.

Under measurement conditions where the surface of the product behaves like a time-varying scatterer, such as for a turbulent surface, the signal strength of the reflected signal may vary over time corresponding to the time variation of the surface. In a relatively slow measurement where the time of a measurement is significantly longer than the periodicity of the time-varying surface, the reflected signal will be a time-averaged signal representing the time-average of the surface. In the present context, the periodicity of the surface relates to the variation in surface level over time at a specific point of the surface. Therefore, in cases where the measurement is significantly slower than a periodic time-variation of the surface, the actual time when the measurement is performed in relation to the periodicity of the surface does not influence the result of the measurement.

The opposite is true in a fast measurement system where the time of a measurement may be equal to or less than the periodicity of a time-varying surface. If a measurement cycle is initiated at a time when the reflected signal has a relatively low amplitude, the measurement may fail or the measurement result may be unreliable, thereby leading to unnecessary energy consumption as the measurement may have to be repeated until it is performed successfully. However, by transmitting an initial signal, a probing signal, which may be significantly shorter than the measurement signal, to establish if a sufficient portion of the signal is reflected, it can be determined if measurement conditions are favorable. Thereby, it is more likely that a measurement is only initiated and performed under conditions likely resulting in a successful measurement, thereby leading to improved energy efficiency as the number of failed measurements is reduced.

Additionally, in a level gauge system where the time of a measurement is significantly shorter than the period of the surface, the time from determining that the amplitude of a reflected probing signal is larger than a predetermined threshold value to the completion of a measurement is sufficiently for the surface to be considered as quasi-static for the duration of the measurement.

Consequently, a level gauge system according to embodiments of the present invention is particularly useful when measuring on a periodic time-varying surface where the period of the time-varying surface is at least equal to or longer than the duration of a measurement. The active time of the system, defined as the time from transmitting a first probing pulse to the completion of a measurement, is thereby related to the periodicity of the time-variation of the surface. In particular, assuming that surface conditions are such that a measurement is possible at some point during a period of the time-varying surface, the active time is shorter than or equal to a period of the varying surface. A typical period of a turbulent surface may be on the order of 10 ms.

Accordingly, it is advantageous to use the method according to the present invention in a system for intermittent measurements, and in particular when measuring a time varying surface, in order to reduce energy consumption.

In the present context, a time varying surface may for example be a turbulent surface where the source of turbulence may be boiling, stirring or other effects resulting in a motion of the product in a tank.

In some circumstances, the surface of a product may vary randomly. However, also in the case of randomly varying surfaces it is advantageous to use the method according to embodiments of the present invention to determine a filling level as it is more likely that a successful measurement can be performed if it is determined that the conditions at the start of the measurement are such that a sufficient portion of the transmitted signal is reflected.

The term probing signal should in the present context be understood as any signal used to determine whether measurement conditions are favorable. The probing signal may for example be a single pulse having a predetermined shape and amplitude.

A measuring signal may be any type of electromagnetic signal such as a continuous periodic signal, a pulse train, discrete pulses or any other signal format known to the person skilled in the art. Furthermore, the measurement may advantageously be based on a time-of-flight principle where the time may be acquired directly or indirectly from for example the amplitude, phase, phase shift or frequency content of the reflected signal.

The parameter value indicative of an amplitude of the reflected probing signal may be the actual amplitude of the reflected probing signal. By comparing the amplitude of the reflected probing signal with a predetermined threshold value, it can be determined if the amplitude of the reflected signal is such that a measurement may be successfully performed. However, the parameter value indicative of an amplitude of the probing signal may be any characteristic related to an amplitude of the signal such as absolute or relative amplitude, energy content, phase, shape or any other parameter which may be directly or indirectly related to the amplitude of the signal.

According to one embodiment of the invention, in case said parameter value determined in step c) is indicative of an amplitude smaller than or equal to the predetermined threshold value, the method returns to step a). Thereby, a probing signal may be repeatedly transmitted until a reflected probing signal indicating that measurement conditions are favorable is received. Alternatively, to avoid indefinite transmission of probing signals which may be the case under conditions where the properties of the surface are such that a sufficient portion of the signal is not reflected, there may be a limit on the number of probing signals to be sent or a preset time-out limit after which the transmission of probing signals is interrupted and the system returns to a passive mode.

In one embodiment, a time required for performing steps d) to f) may not exceed 100 μs. In many circumstances it is advantageous that the measurement takes as little time as possible. From an energy efficiency perspective it is desirable to reduce the time of the measurement, thereby reducing the active time of the system. Furthermore, a fast measurement increases the probability that the entire measurement is performed under the same surface conditions as when the probing signal was reflected.

According to one embodiment of the invention, the measuring signal is formed as a pulse train of distinct carrier pulses each having a duration greater than 1 microsecond.

In this embodiment of the invention, step f) may comprise the steps of: f1) determining actual phase properties of each distinct pulse received in relation to each corresponding distinct pulse transmitted; f2) determining, based on an initially estimated distance, expected phase properties of each received distinct pulse in relation to each corresponding transmitted distinct pulse; and f3) correlating the actual phase properties with the expected phase properties to provide an updated estimation of the distance.

Furthermore, the initially estimated distance may be acquired by an initial distance measurement.

According to a second aspect of the present invention, it is provided a level gauge system, for determining a filling level of a product contained in a tank, the level gauge system being operable in a probing state and in a measuring state, and comprising: a radar module for generating, transmitting and receiving electromagnetic signals; a propagating device connected to the transceiver and arranged to propagate a transmitted electromagnetic signal towards the product inside the tank, and to receive a reflected electromagnetic signal resulting from reflection of the transmitted electromagnetic signal at a surface of the product contained in the tank; and processing circuitry connected to the transceiver, the processing circuitry comprising: operation control circuitry; comparing circuitry; and filling level determination circuitry, wherein: when the level gauge system operates in the probing state: the operation control circuitry controls the radar module to transmit a probing signal; the comparing circuitry compares a parameter value indicative of an amplitude of a received reflected probing signal with a predetermined parameter value indicating an amplitude threshold value; and the operation control circuitry controls the level gauge system to transition to said measuring state if said amplitude is larger than said amplitude threshold value; and when the radar level gauge system operates in the measuring state: the operation control circuitry controls the radar module to transmit an electromagnetic measuring signal; and the filling level determination circuitry determines the filling level based on a time relation between the transmitted electromagnetic measuring signal and a received reflection thereof.

The propagation device may be any device capable of propagating electromagnetic signals, including transmission line probes, waveguides and various types of radiating antennas such as horn antennas, array antennas etc.

It should be noted that the processing circuitry may be implemented as one or several microprocessors comprised in the level gauge system. Furthermore, the operation control circuitry, comparing circuitry and filling level circuitry may be implemented as individual microprocessors or as integrated functions in a single microprocessor or circuit board.

According to one embodiment of the invention, when the level gauge system operates in the probing state: the operation control circuitry may control the level gauge system to remain in the probing state if the amplitude is smaller than or equal to the predetermined value.

In one embodiment of the invention, the level gauge system may further comprise a real time sampler, wherein, when the radar level gauge system operates in the measuring state: the real time sampler samples the received reflection of the transmitted electromagnetic measuring signal in real time, and provides a sampled reflection signal to the filling level determination circuitry; and the filling level determination circuitry determines the filling level based on a time relation between the transmitted electromagnetic measuring signal and the sampled reflection signal.

Further effects and features of this second aspect of the present invention are largely analogous to those described above in connection with the first aspect of the invention.

BRIEF DESCRIPTION OF THE DRAWINGS

These and other aspects of the present invention will now be described in more detail, with reference to the appended drawings showing an exemplary embodiment of the invention, wherein:

FIG. 1 schematically illustrates transmitted electromagnetic signals reflected at a time-varying surface;

DETAILED DESCRIPTION EXAMPLE EMBODIMENTS OF THE INVENTION

Figure 2:
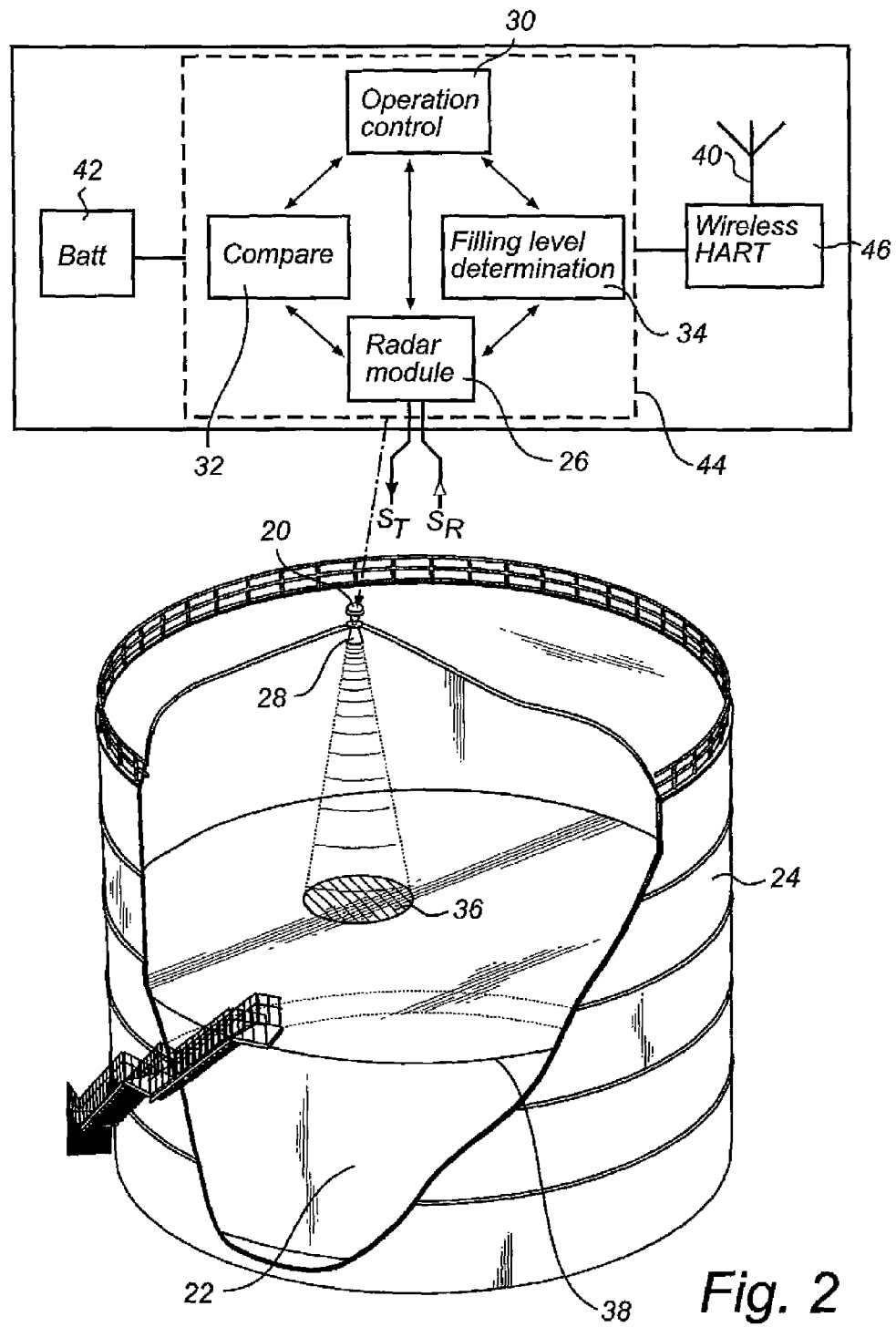
FIG. 2 is a schematic illustration of a radar level gauge system according to an embodiment of the invention.

In the present detailed description, various embodiments of a method and a system according to the present invention are mainly discussed with reference to a radar level gauge system having a free propagating antenna such as a horn antenna for determination of a filling level of a product contained in a tank. It should be noted that this by no means limits the scope of the present invention which is equally applicable to other signal propagating devices including other free propagating antennas such as a rod antenna, a patch antenna, a fixed or movable parabolic antenna or a conical antenna, and wave guides such as a still pipe, a transmission line or a probe such as a single line probe (including a so called Goubau probe), a twin line probe or a coaxial probe.

FIG. 1a schematically illustrates a transmitting and receiving antenna 1 in a level gauge system transmitting an electromagnetic signal 2 towards the surface 3 of a product. As the signal 2 reaches the surface 3, at least a portion of the signal is reflected 4. Illustrated in FIG. 1a is the case where the surface has such properties so that the reflected signal is reflected in a direction not directly towards the receiving antenna 1. Thereby, the amplitude of the reflected signal reaching the antenna is reduced in comparison with the transmitted signal. This is also illustrated in the diagram in FIG. 1a by the pulse 5 representing the transmitted signal 2 and the reflected pulse 6 representing the portion of the reflected signal 4 received by the antenna. FIG. 1b schematically illustrates a case where the properties of the surface 7 are such that the transmitted signal 2 is reflected primarily perpendicularly to the surface 7, causing the majority of the reflected signal 8 to reach the receiving antenna 1. As illustrated in the diagram in FIG. 1b, the amplitude of the reflected signal 10 reaching the antenna is significantly larger than the reflected signal 6 shown in FIG. 1a. Thereby, the amplitude of the received signal 10 in FIG. 1b may be taken as an indication that measurement conditions are more favorable in that a larger portion of the transmitted signal 5 is reflected and received by the receiving antenna 1 compared to the received signal 6 in FIG. 1a. It should be noted that the signals and pulses shown in FIG. 1 are merely exemplary schematic representations in order to illustrate how the reflection of signal may be affected by a time-varying surface.

FIG. 2 schematically illustrates a radar level gauge system 20 for determining the filling level of a product 22 contained in a tank 24 according to embodiments of the present invention. The radar level gauge system 20 comprises a radar module 26, a propagation device 28 and processing circuitry 44 comprising operation control circuitry 30, comparing circuitry 32, filling level determination circuitry 34 and a radar module 26. Although shown here as separate blocks, the processing circuitry 44 may equally well be provided on the same circuit board or implemented in the same microprocessor.

By analyzing a measuring signal $S_T$ being transmitted by the antenna 28 towards a target area 36 of the surface 38 of the product 22, and a reflected signal $S_R$ traveling back from the surface 38, the filling level determination unit 34 can determine the distance between a reference position and the surface 38 of the product 22, whereby the filling level can be deduced. It should be noted that, although a tank 24 containing a single product 22 is discussed herein, the distance to any material interface present in the tank 24 can be measured in a similar manner. The filling level is communicated to a remote location through communication antenna 40.

In operation, the radar module 26 generates an electromagnetic measuring signal $S_T$ and receives a reflected signal $S_R$. The radar module 26, which will be described in more detail below, provides data from which the filling level can be determined to the processing circuitry 44.

The processing circuitry 44 determines the filling level, and/or another process parameter, and provides this information to a remote location via the wireless communication unit 34, which may advantageously be compliant with WirelessHART (IEC 62591).

The processing circuitry 44 may also receive various commands via the wireless communication unit 34 and may control the radar module in response to such commands. In particular, the processing circuitry 44 may receive wake-up signals via the wireless communication unit 34, perform a measurement operation, report the determined filling level and then go back to sleep. This kind of intermittent operation is an important factor for achieving autonomous operation for a long time without user intervention. The radar module 26, the processing circuitry 44 and the wireless communication unit 34 are all supplied with power from a local power source, such as a battery 42.

Figure 3:
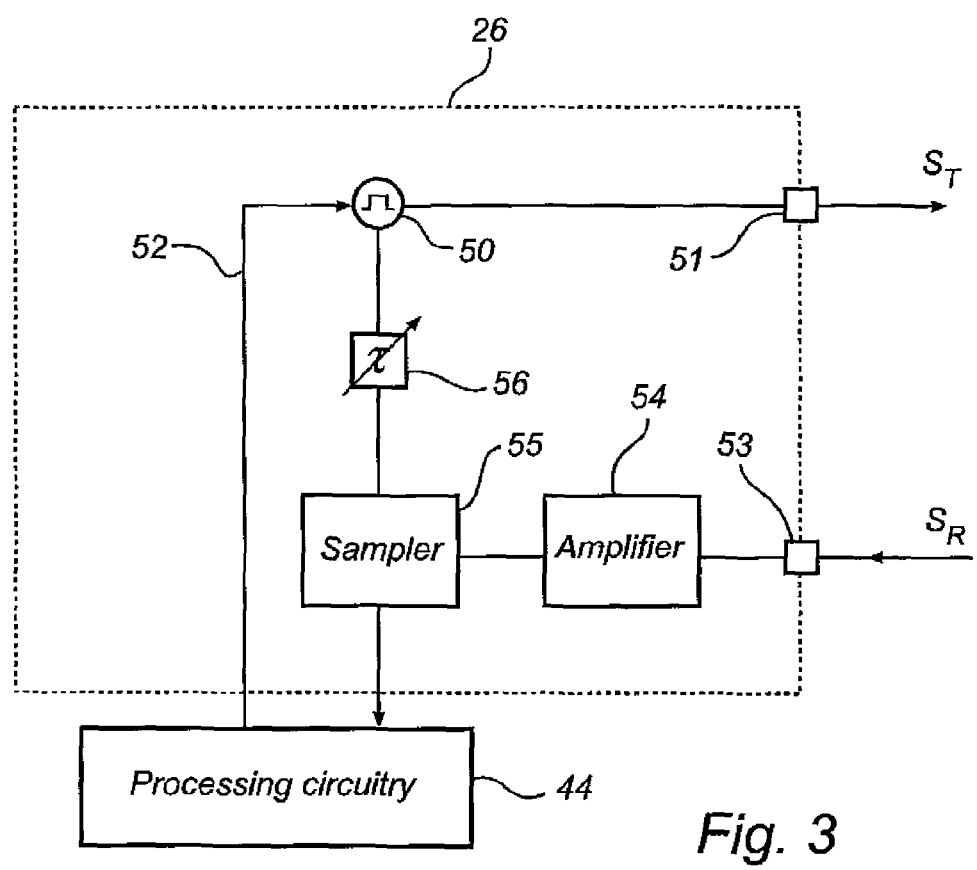
FIG. 3 is a block diagram of the radar module shown in FIG. 2.

FIG. 3 shows a more detailed block diagram of the radar module 26 in FIG. 2. The radar module 26 comprises a transmitter part and a receiver part integrated on a single chip. A single chip design may be achieved by integration on a single silicon die, or on multiple silicon dies integrated in a single, mountable component.

The transmitter part includes a pulse generator 50 arranged to generate and transmit pulses having a desired frequency and pulse shape. The pulse generator 50 is connected to the signal propagation device 28 via an output terminal 51. The repetition frequency of the pulse generator 50 is governed by an external clock signal 52, e.g. received from the processing circuitry 44. As an example, the center frequency of the pulses can be 3.4 GHz, and the repetition frequency can be in the range 1-100 MHz, e.g. 90 MHz. The duration of each pulse may be in the order of nanoseconds. The receiver part includes an input terminal 53 connected to an amplifier 54 arranged to amplify a signal received at the input terminal 53. The receiver part further includes a real time sampler 55 arranged to sample the received signal in real time. In the context of radar level gauging, real time sampling indicates a resolution in the order of picoseconds. The sampler 55 is connected to the pulse generator 50 via a time delay unit 56, and is arranged to begin sampling of the received signal a preset delay t after the time of emission of a measuring pulse by the pulse generator 50.

According to one embodiment, the sampler 55 may be arranged to operate according to the "swept threshold sampling" principle described in "Thresholded samplers for UWB impulse radar" by Hjortland et al., herewith incorporated by reference. According to this approach, the received signal is compared with a threshold, and the unclocked output is sampled by an array of inverter stages. An exemplary configuration of the transmitter and receiver parts of the radar module 26 for swept threshold sampling will now be described with reference to FIG. 4, which shows the real time sampler 55 of FIG. 3 in more detail.

Figure 4:
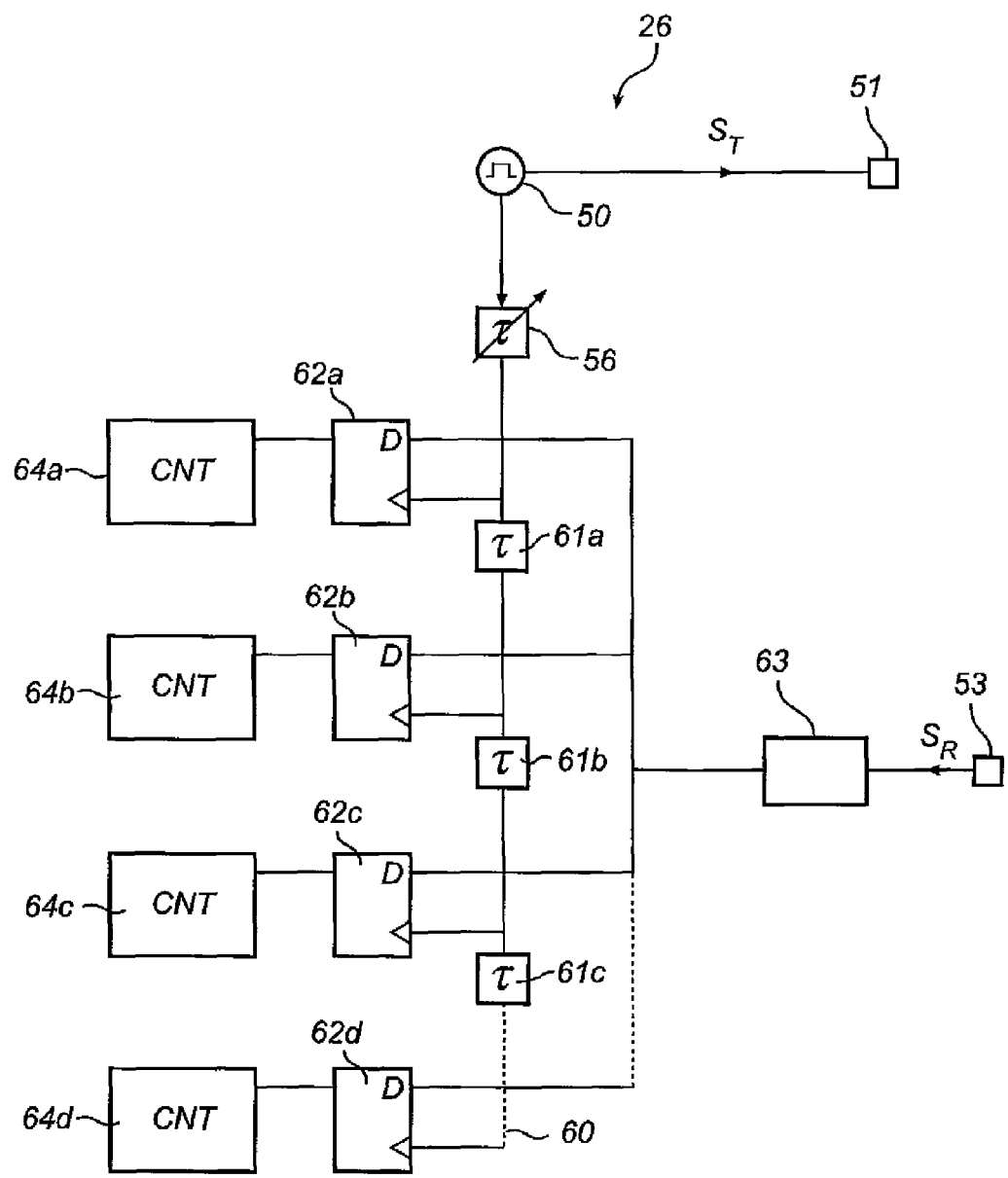
FIG. 4 illustrates an exemplary embodiment of the transmitter and receiver parts of the radar module shown in FIG. 3.

As can be seen in FIG. 4, the real time sampler 55 comprises a sampling delay line 60 formed by a plurality of sampling delay elements 61a-c arranged in series. Between the delay elements 61a-c, the sampling delay line 60 is connected to a series of D flip-flops 62a-d. The D flip-flops 62a-d are also connected, at the D-input, to the input terminal 53 via thresholding circuitry 63. The output of each of the D flip-flops 62a-d is connected to a respective counter 64a-d.

Through the propagation delay along the sampling delay line 60, the D flip-flops 62a-d will be triggered at different times by the delayed measuring pulse that originates from the pulse generator and is traveling along the sampling delay line 60. Accordingly, the signal at the D-inputs of the D flip-flops 62a-d will be sampled at different times, with the time between consecutive samples—the sampling period—corresponding to the signal propagation delay of a delay element 61a-c.

In swept threshold sampling, the input signal (in this case the reflected signal $S_R$) is compared to a threshold value in the thresholding circuitry 63. If/when the input signal $S_R$ is higher than the threshold value, the output from the thresholding circuitry 63 is "high", and when the input signal $S_R$ is lower than the threshold value, the output is "low". If the output is "high" when sampled at the D flip-flops 62a-d, a "1" will be provided to the counter from that ID flip-flop 62a-d. In other words, a binary sequence will be provided.

The sampling is repeated several times, while gradually increasing (sweeping) the threshold, thereby resulting in a plurality of binary sequences. These binary sequences are combined to produce a digitally sampled signal, having a resolution (in terms of signal amplitude) that corresponds to the number of sampling repetitions plus one.

The sampling delay line 60 may, for example, comprise 128 sampling delay elements, each formed by one (or several) inverter stage(s). In this case, a binary sequence of 128 bits will be formed. If only one sampling is performed, the resolution (in terms of signal amplitude) will be 2 (high or low). If 511 samplings are performed, the resolution will be 512, or $2^9$. The sampler can optionally be arranged to acquire repeated sample sequences and to average the result, in order to reduce the effect of noise.

The effective sampling-rate (the resolution in terms of time) will be inversely proportional to the propagation delay of a single sampling delay element. As an example, if the propagation delay of one of the sampling delay elements (one inverter stage) is about 30 ps, the sampling rate will be close to 35 GS/s. As electromagnetic waves travel at a speed of 0.3 mm/ps in vacuum, the spatial resolution of the sampler would then be around 9 mm if a one-way delay is measured or 4.5 mm if a two-way delay is measured.

An alternative measurement method based on a frequency modulated pulsed wave (FMPW) is described in application Ser. No. 12/981,995, hereby incorporated by reference in its entirety.

An exemplary method according to an embodiment of the present invention will now be described with reference to the schematic illustration of a radar level gauge system in a tank shown in FIG. 2 and the flowchart shown in FIG. 5 outlining the general steps of the method.

Figure 5:
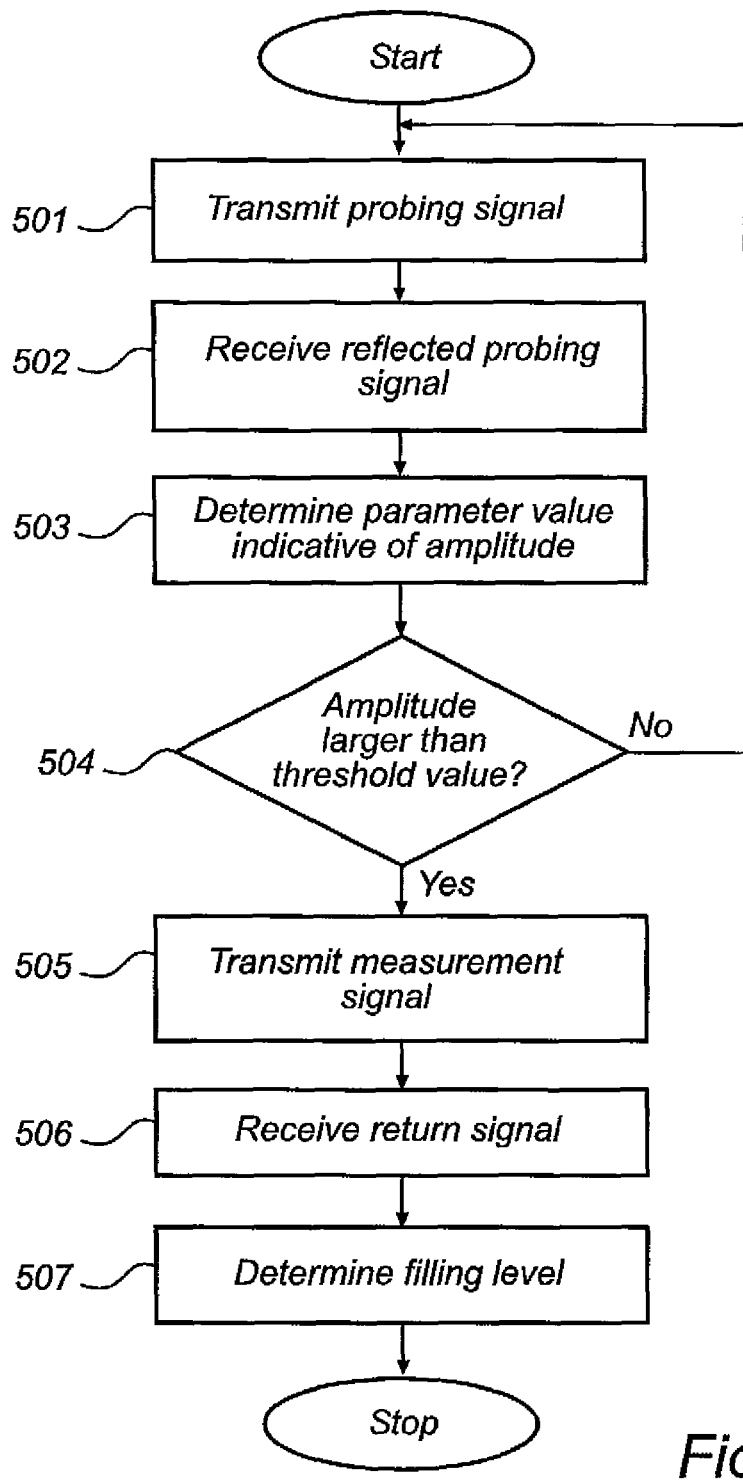
FIG. 5 is a flow chart outlining a method according to an embodiment of the invention.

In a first step 501 in FIG. 5, a probing signal is transmitted towards a target area 36 of the surface 38 of the product 22. The probing signal may be a single pulse with a predetermined shape and amplitude. Next, in step 502 the probing signal is reflected at the surface 38 and the portion of the reflected signal which is propagating towards the receiving antenna is received. In step 503, a parameter value indicative of the amplitude of the received signal is determined. For example, the parameter value may be the actual amplitude of the pulse. In step 504, a comparison of the amplitude, or any equivalent property such as energy, shape or phase, of the received pulse with a predetermined threshold value is performed. If the amplitude of the received pulse is above the threshold value, it is determined that the conditions of the surface are such that a sufficient portion of the transmitted pulse is reflected in order to successfully perform a measurement determining the position of the surface and thereby the filling level of the tank. If, on the other hand, the amplitude of the reflected signal is equal to or below the threshold value, the method returns to step 501 and a new probing signal is transmitted. Thereby, a measurement may be postponed until the properties of the surface are such that a measurement is likely to succeed. However, should successive probing signals fail to provide a reflected signal fulfilling the threshold requirement, the transmission of probing signals may be interrupted after a predetermined number of transmitted signals or after a predetermined time-out period. Alternatively, a measurement may be performed after a number of transmitted probing signals or after a given time even if the threshold condition is not fulfilled.

In step 505 a measurement signal is transmitted towards the aforementioned target area 36 of the surface of the product. It is desirable that the measurement signal is reflected at the same target area as where the probing signal was reflected so that the properties of the surface are comparable for both signals. This is possible given that the time of the measurement and the time between receiving the probing signal and initializing the measurement is short in relation to the variation of the surface. In step 506 the reflected measurement signal is received and finally in step 507 the filing level is determined based on the distance to the surface.

The person skilled in the art realizes that the present invention by no means is limited to the preferred embodiments described above. On the contrary, many modifications and variations are possible within the scope of the appended claims. For example, the probing signal may be configured in many different ways while still adhering to the general concept of the invention. Furthermore, the filling level determination may utilize any present or future suitable determining scheme. Such a determining scheme should preferably be relatively fast and have high energy efficiency.

What is claimed is:

1. A method of determining a filling level of a product contained in a tank, the method comprising the steps of:

a) in a probing state, transmitting an electromagnetic probing signal towards a target area of a surface of said product;
b) receiving a reflected probing signal being a reflection of the electromagnetic probing signal at said surface;
c) determining a parameter value indicative of an amplitude of the reflected probing signal;
returning to step a) if said parameter value determined in step c) is indicative of an amplitude smaller than or equal to said predetermined threshold value; and
if said parameter value determined in step c) is indicative of an amplitude larger than a predetermined threshold value, the method further comprising steps of:
d) in a measuring state, transmitting an electromagnetic measuring signal towards said target area of the surface;
e) receiving a return signal being a reflection of the electromagnetic measuring signal at the surface; and
f) determining the filling level based on a time relation between said electromagnetic measuring signal and said return signal;
wherein said probing signal is significantly shorter than said measuring signal.

2. The method according to claim 1, wherein a duration of said probing signal is on the order of nanoseconds.

3. The method according to claim 1, wherein said measuring signal consists of a pulse train of distinct carrier pulses.

4. The method according to claim 3, wherein step f) comprises the steps of:
f1) determining actual phase properties of each distinct pulse received in relation to each corresponding distinct pulse transmitted;
f2) determining, based on an initially estimated distance, expected phase properties of each received distinct pulse in relation to each corresponding transmitted distinct pulse; and
f3) correlating said actual phase properties with said expected phase properties to provide an updated estimation of said distance.

5. The method according to claim 4, wherein said initially estimated distance is acquired by an initial distance measurement.

6. The method according to claim 1, wherein said probing signal is a single pulse.

7. The method according to claim 1, wherein said measuring signal consists of a pulse train of distinct carrier pulses and said probing signal is a single pulse.

8. The method according to claim 1, wherein a time required for performing steps d) to f) does not exceed 100 µs.

9. The method according to claim 1, wherein said measuring signal is formed as a pulse train of distinct carrier pulses each having a duration greater than 1 microsecond.

10. A level gauge system, configured to determine a filling level of a product contained in a tank, the level gauge system being operable in a probing state and in a measuring state, and comprising:
a transceiver configured to generate, transmit and receive electromagnetic signals;
a propagating device connected to said transceiver and configured to propagate a transmitted electromagnetic signal towards said product inside the tank, and to receive a reflected electromagnetic signal resulting from reflection of the transmitted electromagnetic signal at a surface of the product contained in the tank; and
processing circuitry connected to said transceiver, said processing circuitry comprising:
operation control circuitry;
comparing circuitry; and
filling level determination circuitry,
wherein:
when the level gauge system operates in said probing state:
the operation control circuitry is configured to control the transceiver to transmit a probing signal;
the comparing circuitry is configured to compare a parameter value indicative of an amplitude of a received reflected probing signal with a predetermined parameter value indicating an amplitude threshold value; and
the operation control circuitry is configured to control the level gauge system to transition to said measuring state if said amplitude is larger than said amplitude threshold value, and to transmit a new probing signal if said amplitude is lower than said amplitude threshold value; and
when the level gauge system operates in said measuring state:
the operation control circuitry is configured to control the transceiver to transmit an electromagnetic measuring signal; and
the filling level determination circuitry is configured to determine said filling level based on a time relation between said transmitted electromagnetic measuring signal and a received reflection thereof;
wherein said probing signal is shorter than said measuring signal.

11. The system according to claim 10, wherein a duration of said probing signal is on the order of nanoseconds.

12. The system according to claim 10, wherein said measuring signal consists of a pulse train of distinct carrier pulses and said probing signal is a single pulse.

13. The level gauge system according to claim 10, wherein, when the level gauge system operates in said probing state:
the operation control circuitry is configured to control the level gauge system to remain in said probing state if said amplitude is smaller than or equal to said predetermined threshold value.

14. The level gauge system according to claim 10, further comprising a real time sampler, wherein,
when the radar level gauge system operates in said measuring state:
said real time sampler is configured to sample said received reflection of said transmitted electromagnetic measuring signal in real time, and to provide a sampled reflection signal to said filling level determination circuitry; and
said filling level determination circuitry is configured to determine said filling level based on a time relation between said transmitted electromagnetic measuring signal and said sampled reflection signal.

* * * * *